United States Patent [19]
Manning

[11] Patent Number: 5,700,039
[45] Date of Patent: Dec. 23, 1997

[54] EXHAUST PIPE TO HOSE ADAPTER FOR VERMIN EXTERMINATION

[76] Inventor: Michael J. Manning, P.O. Box 725, Danville, Calif. 94526

[21] Appl. No.: 627,390

[22] Filed: Apr. 4, 1996

[51] Int. Cl.[6] .......................... F16L 19/02; A01M 13/00
[52] U.S. Cl. ............... 285/148.23; 43/125; 285/148.17; 285/148.19
[58] Field of Search ................ 43/124, 125; 285/174, 285/175, 177, 148.17, 148.19, 148.23

[56] References Cited

U.S. PATENT DOCUMENTS

| | | | |
|---|---|---|---|
| 1,529,785 | 3/1925 | Hammond et al. | 43/125 |
| 1,975,925 | 10/1934 | Compo | 285/177 |
| 2,467,922 | 4/1949 | Woytal et al. | 285/174 X |
| 2,515,341 | 7/1950 | Giguere | |
| 2,733,668 | 2/1956 | Pfetzing | 285/177 X |
| 3,248,133 | 4/1966 | Michnoff | 285/177 |
| 4,026,330 | 5/1977 | Dunn | 138/103 |
| 4,190,269 | 2/1980 | Purdy | 285/177 X |
| 4,266,813 | 5/1981 | Oliver | 285/175 X |
| 4,693,421 | 9/1987 | Cameron | 285/177 X |
| 4,906,032 | 3/1990 | Hohman | 285/177 X |
| 5,109,629 | 5/1992 | King et al. | 43/124 X |
| 5,588,252 | 12/1996 | Jones | 43/124 |

*Primary Examiner*—John A. Ricci

[57] ABSTRACT

An exhaust pipe adapter for connecting a conventional garden hose to an exhaust pipe of a vehicle for the purpose of humanely exterminating underground dwelling vermin by the exhaust fumes of the vehicle being directed from the distal end of the garden hose into a hole in the ground. The exhaust pipe adapter includes a tubular rubbery body having a large opening at one end sized for placement over and releasable connection to an exhaust pipe end, and the opposite end of the adapter is affixed with rigid male threads sized for connection to the female end of a standard garden hose. The rubbery body of the adapter includes differing internal diameters to allow it to be snugly attached to largely varying exhaust pipe diameters. An adjustable circular hose clamp is provided to compress the rubbery body onto the exterior surface of the exhaust pipe to maintain the adapter in place during use.

18 Claims, 6 Drawing Sheets

EXHAUST PIPE TO HOSE ADAPTER FOR VERMIN EXTERMINATION

BACKGROUND OF THE INVENTION

1. Field of the Invention

This invention relates to the extermination of underground dwelling pests by poisoning with gasses. More particularly the invention relates to utilizing a versatile adapter for attachment of one end of a conventional garden water hose to the exhaust pipe of an internal combustion engine and placement of the opposite end of the hose within a hole in the ground leading to the underground dwelling of vermin.

2. Description of the Prior Art

Ground dwelling vermin such as moles, gophers, ground squirrels and the like, and to a lesser extent, insects, have long been a problem to gardeners, landscapers and farmers. Various well known methods of exterminating these pests include spring-type traps particularly for larger animals such as moles and gophers, poison gas flares and poison solid bait. Not only are these methods potentially dangerous to the environment and or children and pets, but they can often be ineffective, due to the unique burrowing nature of the vermin.

Another well known method of eradicating ground dwelling pests is utilized in U.S. Pat. No. 4,026,330, issued to K. M. Dunn on May 31, 1977 describing new structure for feeding engine exhaust gas into underground cavities to kill rodents. Dunn provides a rigid threaded fitting for attachment to the exhaust pipe port of the internal combustion engine of a lawnmower which is used to direct carbon monoxide into a rodent's hole through a hose connected to the rigid threaded fitting. The Dunn device appears to be particularly directed towards use only with a lawnmower engine as the attachment end of his threaded fitting is for attachment to the threaded exhaust pipe port in the block of the lawnmower engine, after removal of the muffler. Lawnmower exhaust ports are typically ½ or ¾ inch holes in the engine block having internal pipe threads. "Pipe threads" will not mate with conventional garden water hose fittings, as "pipe" threads and "hose" threads are incompatible. The Dunn invention requires the removal of the muffler of the lawnmower which is time consuming and inconvenient, and it does not appear usable on other vehicles such as passenger vehicles, pick-up trucks, recreational vehicles (RVs), and tractors. The Dunn U.S. Pat. No. 4,026,330 is however herein incorporated by reference for its showing of an internal combustion engine on a vehicle (lawnmower).

Another device which directs vehicle exhaust through a hose to another location includes a de-icing attachment for motor vehicles, which was issued as U.S. Pat. No. 2,515,341 to P. T. Giquere on Jul. 18, 1950. Giquere's device includes a flexible section of hose with one end affixed with a coupler adapted for placement over the end of a vehicle exhaust pipe. The coupler is affixed in place over the exhaust pipe with a tightening arrangement. The opposite end of the hose is affixed with a widened emission nozzle having a handle for directing the exhaust onto the pavement for melting the ice or snow. The Giguere device also appears very limited in its use, being attachable only to an exhaust pipe of a given size. The distal end of the hose is also not particularly adapted for placement in a rodent's tunnel.

Both previously mentioned prior art arrangements exemplify typical prior art problems, as both are limited in their range of adaptability for use with differing sizes and shapes of exhaust pipes on differing vehicles, and both are relatively more expensive in that specialized hoses of quite limited length are utilized.

In reference to using engine exhaust fumes for underground pest control, by not providing a highly versatile exhaust pipe adapter which will fit numerous exhaust pipe sizes and shapes of varying vehicles, and which is structured for use with commonly available garden water hoses which almost everyone already owns, the cost is increased, and the usefulness or versatility is decreased.

Therefore, there is a need in the field of pest extermination for a quick, simple, highly versatile and effective, low cost arrangement of directing poisonous exhaust fumes from an internal combustion engine source into an underground tunnel for the purposes of pest extermination.

SUMMARY OF THE INVENTION

The following detailed description is of best modes and preferred structures given for example to allow those skilled in the art to both build and use the present invention, and there are clearly some changes which could be made to that which is specifically herein described and shown in the included drawings, but for the sake of briefness of this disclosure, all of these changes which fall within the scope of the present invention have not herein been detailed, but should become apparent to those skilled in the art while reading this disclosure.

The present invention provides an improved method and improved structuring for transmitting poisonous gasses under pressure, such as carbon monoxide, from an internal combustion engine of a source vehicle such as a car, pickup truck, recreational vehicle (RV), tractor or lawnmower exhaust pipe into the underground tunnel of a rodent or other pest for the purposes of exterminating the pests.

The invention includes a versatile exhaust pipe adapter which allows the quick and simple connection of a conventional garden water hose to a wide range of differently sized and shaped exhaust pipes of different internal combustion engines. Disconnection of the exhaust pipe adapter and garden water hose is also quick and simple. The preferred adapter is essentially a tube open centrally therethrough to two oppositely disposed opens ends. The preferred tubular adapter includes a generally cylindrical and flexible body having a large open end sized for fitting over the terminal ends of exhaust pipes of most cars, pickup trucks, recreational vehicles and tractors as well as some lawnmowers. The adapter body preferably includes multiple interior open diameters, and in a preferred embodiment includes two distinct internal diameters defined by annular walls or walling defining the body, with a first being a large diameter open area adjacent and in communication with the large open end of the body, and the second being a smaller diameter open area positioned between the large diameter area and a small rigid male threaded open ended tube (conventional male garden hose fitting) located at a terminal end of the body oppositely disposed of the large diameter end opening. The threaded tube has exposed male threads allowing attachment of a conventional or standard female end fitting of a conventional garden water hose.

The length of the flexible adapter body is sized sufficiently long to adapt to exhaust pipes having the lower edge cut at an angle to direct exhaust downward, and for improved condensation drainage of the exhaust pipe, thereby the adapter body provides enough length to position a hose clamp (adjustable band) beyond the angled cut edge of the exhaust pipe and about the exterior of the adapter. A widely diametrically adjustable hose clamp band is used to compress the flexible adapter body onto the exterior surface of the exhaust pipe, and the adapter body is sufficiently flexible to squeeze downward or inward under the pressure of the clamp to generally conform to the exhaust pipe for a non-slip engagement therewith. The flexible body of the adapter preferably includes resiliency, with this to help maintain the large opening into the body into which the exhaust pipe fits in a normally open position; the normally open position rendering it easier to initially slide the adapter over the end of an exhaust pipe by eliminating the need for the installer to have to hold the opening in an open position during the installation. The adapter body is preferably flexible and resilient, and thus is a rubbery body. The resiliency of the rubbery body also aids in preventing any significant kinking of the body outward beyond the exhaust pipe under the weight of an attached garden hose. The large diameter open end of the body preferably includes several laterally extending short graspable tabs which are used as handles to stretch and pull the large opening of the adapter over the largest sized exhaust pipes the adapter can fit, and the tabs also prevent the hose clamp from slipping off the large open end of the body during installation and removal of the adapter. The large interior diameter of the body tapers or angles downward into the smaller interior diameter. The smaller interior diameter being sized more appropriately to smaller diameter exhaust pipes found on most passenger vehicles such as cars, light pick-up trucks and passenger vans. The tapering or angular transition, defined by a transitional wall between the large interior diameter and the smaller interior diameter eliminates an abrupt edge, and thus helps to smoothly guide smaller exhaust pipes into the smaller diameter area providing a snug fit when initially sliding the adapter over the end of the exhaust pipe. The external diameters and shape of the body is basically the same as the internal diameters and shape including the walling thicknesses, wherein the annular walling defining the larger and smaller diameter areas, and the sloped or angular transitional wall between the two interior diameters are relatively thin, flexible and resilient material. When the body is made of suitable rubbery material such as SBR elastomer for example, these relatively thin walls serve to provide a proper degree of flexibility in the wall areas which receive the hose clamp to allow the walling to be compressed inward, while at the same time providing a proper degree of stiffness in areas which might otherwise collapse or kink under the weight of an attached dangling garden hose, and at the same time define the adapter body in a normally open condition in such a manner that a minimal amount of material can be utilized from which to manufacture the body. The edges or corners (angular changes in the walling of the body as it transitions from one diameter to another) provide stiffening, and it is this stiffening brought about by the shapes in these areas which also aids in allowing the manufacture of the adapter body both properly flexible in the areas where the hose clamp is applied, and stiff in the areas which would otherwise be subject to kinking, while allowing a minimum of material to be utilized to define the adapter body. Although the present adapter from one vantage point is somewhat conically shaped to provide multiple interior diameters, a more classically conically shaped adapter body, as well as some other shapes, would function within the scope of the invention. However, a more conically shaped body would require more materially thick walls or walling to prevent substantial kinking of the body outward beyond the end of the exhaust pipe under the weight of the attached garden water hose, particularly if the conically shaped adapter were long enough to provide a sufficient variety of interior diameters absent abrupt diametrical stepped changes to fit a wide variety of exhaust pipe diameters.

When using the present adapter on larger diameter exhaust pipes, the hose clamp is positioned about the exterior large diameter of the adapter body adjacent the extending tabs and then tightly constricted. For smaller sized exhaust pipes having a square cut terminal end, the hose clamp is positioned over the exterior smaller diameter body area and then tightly constricted. The same single hose clamp is preferably used for both large and small diameter exhaust pipes since it is a widely adjustable clamp. When using the adapter on exhaust pipes having the angular cut edge, the hose clamp is placed on the exterior larger section of the adapter body adjacent the extending tabs and then the clamp is tightly compressed, thus constricting the larger opening until the body contacts the exhaust pipe. While some gaps due to wrinkling of the rubbery body material may result with this particular application when applied to a small diameter exhaust pipe having an angled cut end, or when the adapter is applied to an oval shaped exhaust pipe terminal end, any gas leaking out of such gaps would not significantly adversely effect the function, as an adequate amount of the gasses will still be directed through the attached garden hose. However, the multiple interior diameters of the adapter body in most applications allows a wrinkle and gap free tight seal between the adapter body and the exhaust pipe terminal end. Although most exhaust pipe terminal ends are round, the adapter can also be applied to exhaust pipe terminal ends which are slightly curved, or those which are somewhat oval in shape, as the flexible body of the adapter, as well as, the hose clamp, allows the body and hose clamp to be distorted in shaped to fit these oddly shaped exhaust pipes. If the source vehicle is of the type having dual exhaust pipes, the adapter is simply applied to one pipe, and the other pipe is disregarded, and satisfactory results can still be obtained.

It is important to adequately secure the adapter body to the exhaust pipe, as the exhaust gasses from the pipe are expelled with pressure which can easily dislodge (blow off) an inadequately secured adapter which creates some resistance to the normal exhaust gas flow. The present adapter which adapts a larger exhaust pipe to a smaller garden hose, the garden hose will normally be ½ to ¾ inches in diameter, inherently produces slightly more back pressure in the exhaust system than is normal, and the use of the hose clamp as previously described is an effective, easy to use and low cost arrangement of securing the adapter to the exhaust pipe to prevent the adapter from being blown or pulled off of the end of the exhaust pipe. Likewise, the hose clamp allows loosening of the connection between the adapter and the exhaust pipe to allow some gas pressure relief in the event excessive pressure is indicated as a problem, and the preferred rubbery material of the adapter body which has some frictionally adhesive qualities will maintain the adapter in place with very little clamping pressure. Back pressure in the exhaust system caused by the adapter has not been found to be a problem since in using the present invention the source vehicle engine needs to only be operated at idle speed, and exhaust systems are designed to handle a large volume of exhaust when the engine is operated at high speed.

The smaller area of the body tapers down to the small rigid tube affixed with exposed male threads which are compatible in size and taper with the conventional female coupler and threads found on one end of conventional garden water hoses made for and used in the U.S.A. The male threaded fitting for connecting to a garden hose is securely affixed to the terminal end of the rubbery body oppositely disposed from the large open end of the rubbery body. Both the rubbery body and the male threaded fitting are made of materials having a temperature service factor which can hold-up under the heat of the exhaust gasses and pipe, which varies somewhat from one internal combustion engine to the next. Generally, if the adapter body and male fitting will hold up under around 225 degrees fahrenheit for 30 minutes or so, they will serve the intended purpose. 200 degrees fahrenheit would be a minimum feasible temperature service factor for the adapter body and male hose end, at least for extended use of the adapter longer than just a minutes. Garden water hoses made of vinyl or rubber can be used with the exhaust pipe adapter, although some particularly thin walled garden hoses made primarily of vinyl may permanently distort in shape under the heat of the exhaust fumes adjacent the exhaust pipe given enough time, and so thick walled vinyl or rubber garden water hoses are recommended.

It should be noted that within the scope of the invention, a female garden hose style fitting could be attached to the adapter body instead of the male garden hose fitting previously described, however, the female style fitting is more costly to purchase or manufacture compared to the male fitting, and since the female style fitting includes an internally threaded rotary collar which can become jammed with dirt, and a rubber internal gasket which can fall out and become lost, it is more desirable to insert a male hose end into the hole in the ground than a female hose end. Thus a male hose end is preferred to be attached to the adapter body to interface with the female end of the garden hose, thereby allowing the opposite end of the hose which includes a male end to be inserted into the ground hole.

To use the adapter for extermination of ground dwelling pests, the user attaches the conventional female end of a conventional garden water hose onto the male threaded end of the adapter, and fits the larger open end of the adapter over the terminal end of the exhaust pipe of the source vehicle, for example, a car, pickup truck, RV, tractor or lawnmower. The adapter can be attached to the exhaust pipe prior to the attachment of the garden hose if desired. The adapter is pushed on the end of the exhaust pipe as far as possible. The hose clamp is positioned over the adapter body to be positioned over a smooth continuous section of the exhaust pipe so as to provide generally continuous connection with the interior wall surface of the adapter body encircling the exterior surface of the exhaust pipe when compressed inward by the hose clamp. The hose clamp which fits initially slidably over the exterior of the adapter body can be manipulated by a screwdriver or hex-socket for tightening and loosening the clamp. The free end of the garden hose is then placed in the tunnel opening of the vermin and covered with soil to prevent the exhaust gas directed by the adapter into and through the garden hose from escaping the opening in the ground. Depending on the type and size of the engine, the engine of the vehicle is then operated at idle speed for between approximately 15 and 30 minutes to ensure filling of the underground tunnel system with the poisonous exhaust gasses. When the process is completed, the garden hose end is removed from the ground hole and the adapter is removed from the exhaust pipe and the hose. When the hose is pulled from the hole in the ground, the hole should be plugged with dirt to fully entrap the poisonous exhaust gasses, and the future smell of any dead animals.

The present exhaust pipe adapter and conventional garden water hose is simple, safe and easy to use, making the elimination of rodents and other vermin simple, safe and very cost effective. The adapter is compatible with most sizes and shapes of exhaust pipes which makes it highly versatile, and since it can be used with a common garden water hose which includes standardized end fittings, which most homeowners already own, it can also be provided at a low purchase price to the consumer. The adapter is also quick and easy to connect to the source since there is no preparation or alteration of the exhaust pipe necessary. The preferred shape and rubbery material of the adapter body allows a great degree of adjustability to various sizes of exhaust pipes, and the material is also heat resistant and slip resistant (somewhat frictionally adhesive) which helps maintain the adapter in position on an exhaust pipe under the pressure of the hose clamp, and allows the adapter to be used repeatedly over an extended period of time (possibly years). The present arrangement is also safer to use than other types of poisons, such as solid poisons, which can potentially leach hazardous chemicals such as strychnine into the soil, or lakes and streams, and can also be unearthed by a pet or child. The present invention also makes spring-style traps comparatively more laborious to use since they are often difficult to place in the tunnel without significant digging and without setting off the trap. Traps designed to kill the rodent also pose a potential danger to children and pets if a hand or paw is inserted into a set trap. Traps must also be unearthed and the dead rodent disposed of, which exposes the handler to possible infectious diseases, or even injury if the rodent is not yet dead. With the present invention, the deceased rodents are left underground, eliminating the need for them to be disposed of, since the carbon monoxide gas dissipates quickly and would not prove harmful to pets who may on rare occasion dig up a dead or dying rodent. There is also no danger for pets or children handling a previously used exhaust pipe adapter or garden hose since there would be no appreciable gas or poison residue, unlike containers of poison baits. Another advantage of the present invention is that since a common garden water hose having standardized end fittings is utilized, if extra length in the hose is required, one or more additional garden hoses can be coupled to one another, and this is convenient when the vermin are in the back yard and it is not possible to get a large vehicle (car or truck) close. The present adapter, not necessarily to be sold with the garden hose since it is structured to be used with a common garden hose everyone should already have, will package, ship and display well in a retail store due to its small size and lightweight nature.

These, as well as other objects and advantages of the invention will become more apparent by reading the remaining specification along with reviewing the accompanying drawings.

BEST MODES FOR CARRYING OUT THE INVENTION

Figure 1:
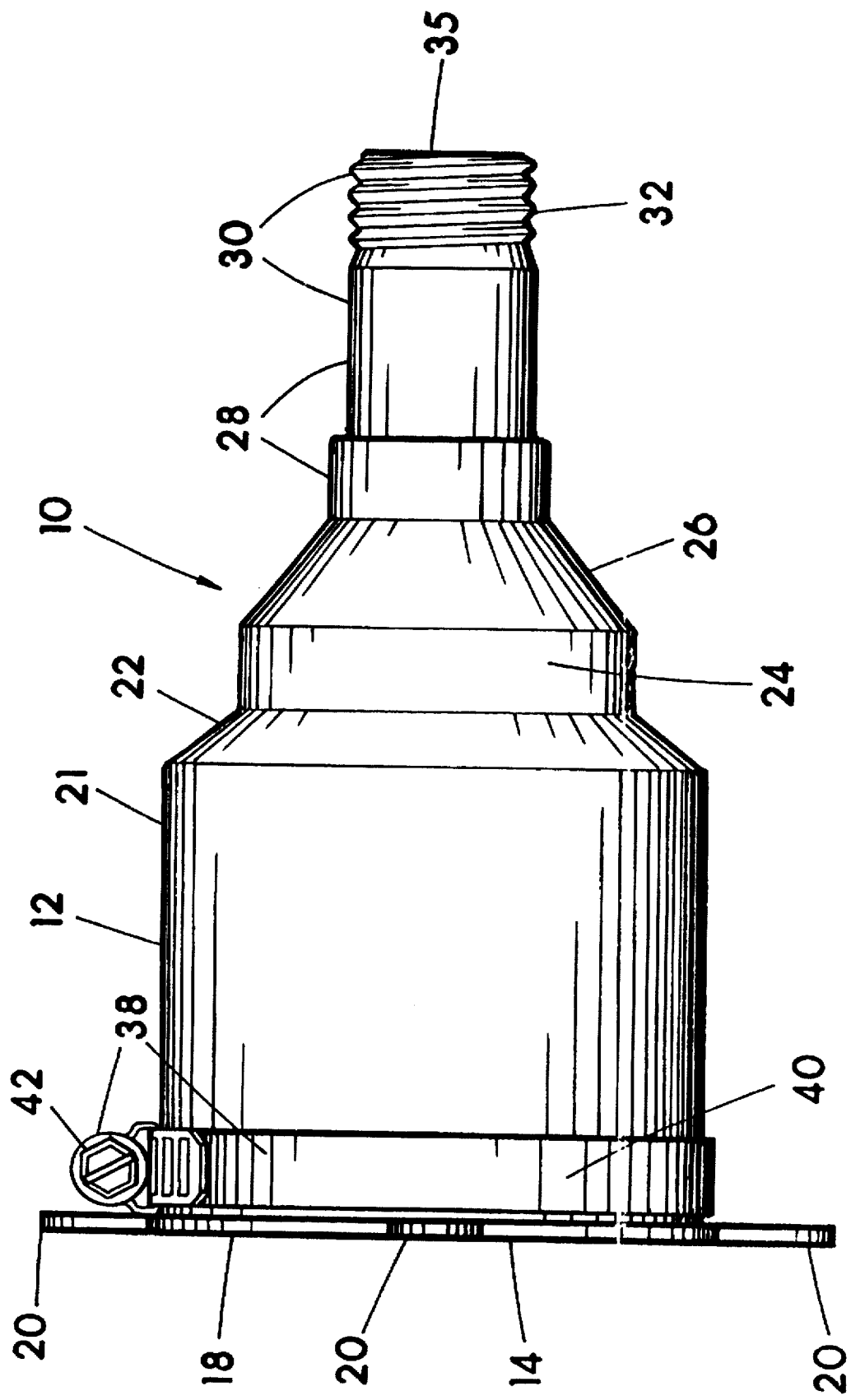
FIG. 1 is a side elevational view of a preferred embodiment of exhaust pipe adapter in accordance with the present invention.
Figure 2:
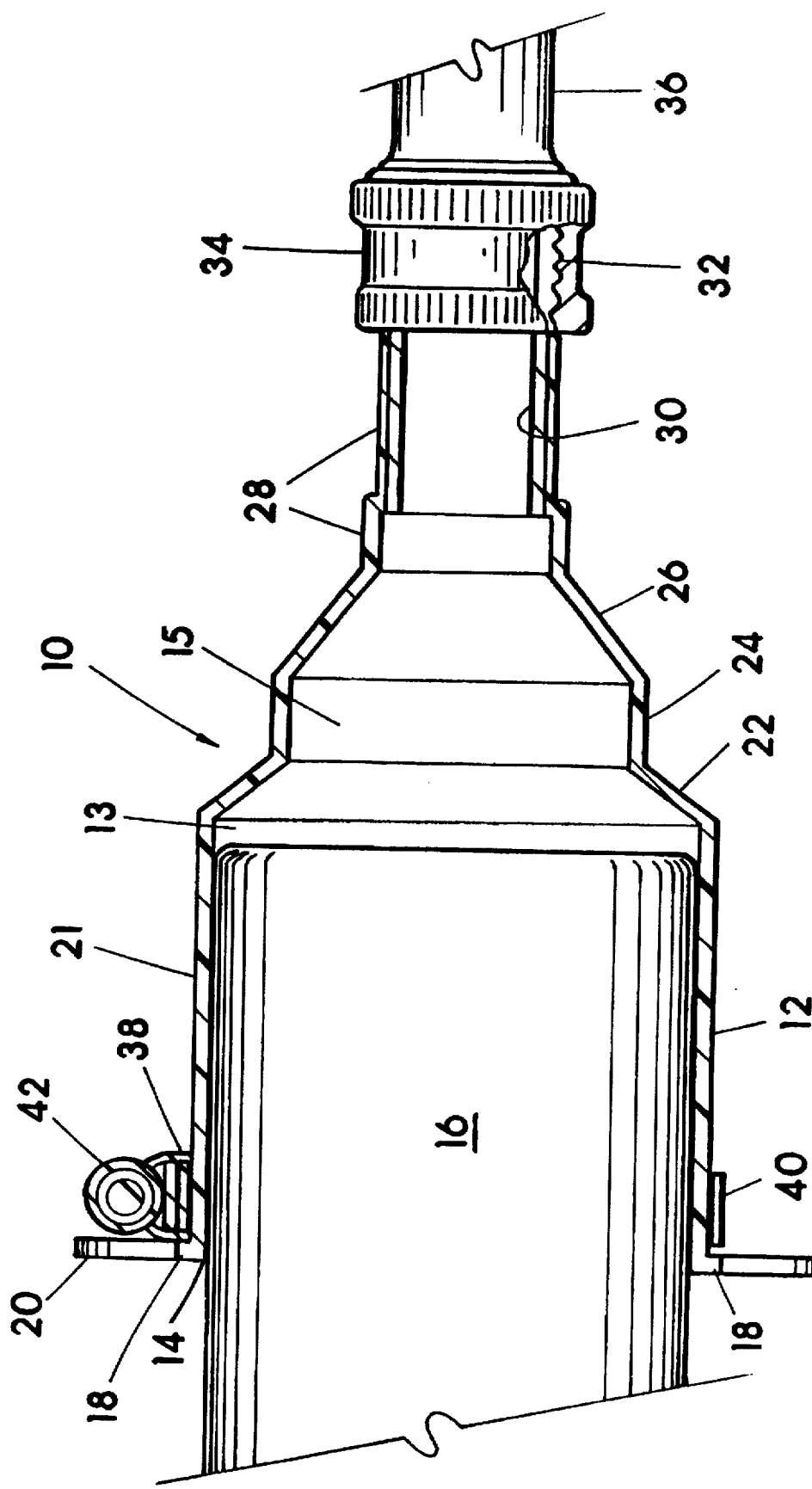
FIG. 2 is a cross-sectional side view showing the exhaust pipe adapter affixed with the hose clamp over a larger sized exhaust pipe and connected to the conventional female end of a conventional garden water hose.
Figure 3:
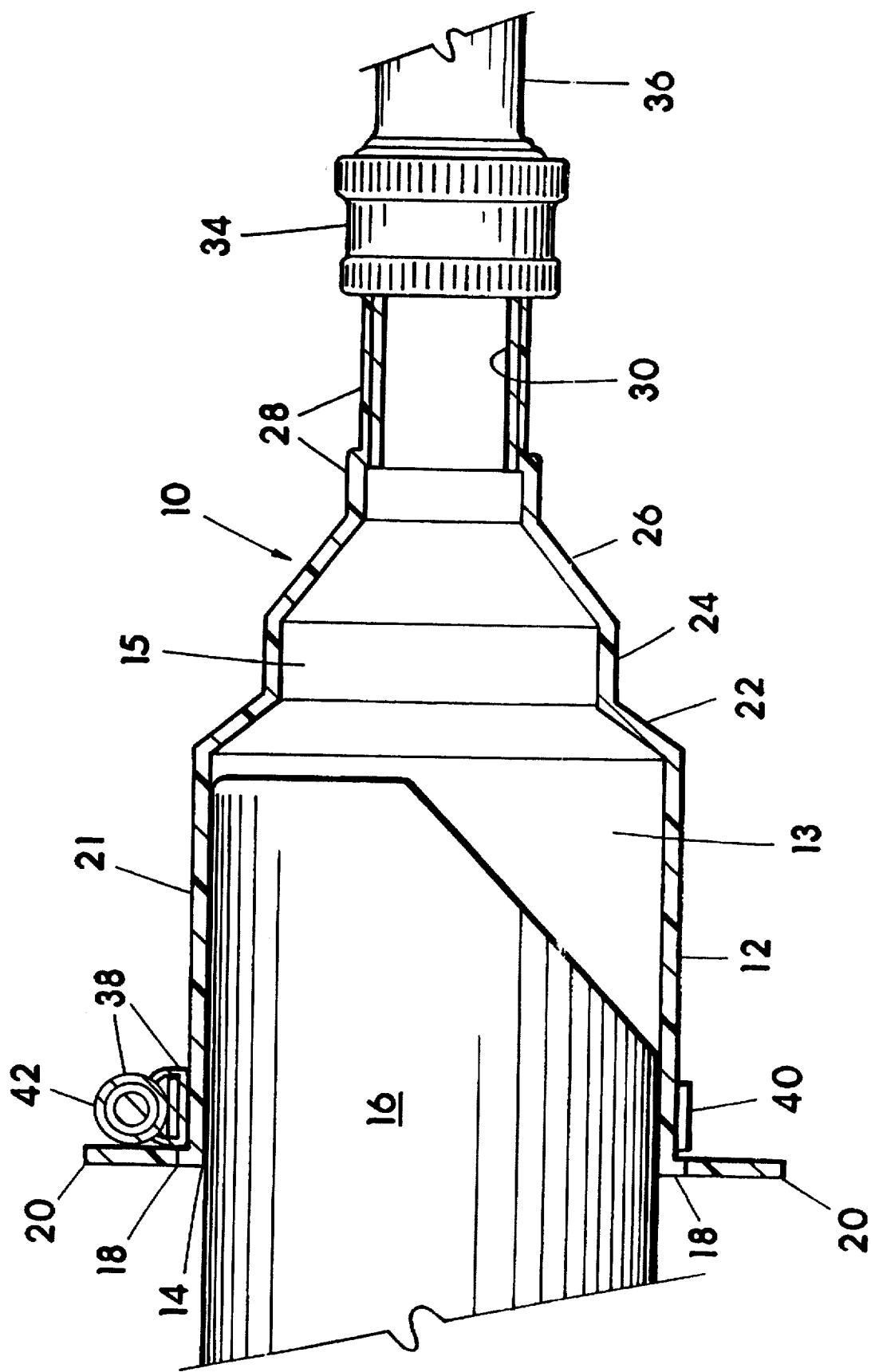
FIG. 3 is a cross-sectional side view showing the exhaust pipe adapter affixed with the hose clamp over a larger sized exhaust pipe of the type having an angled-cut lower edge.
Figure 6:
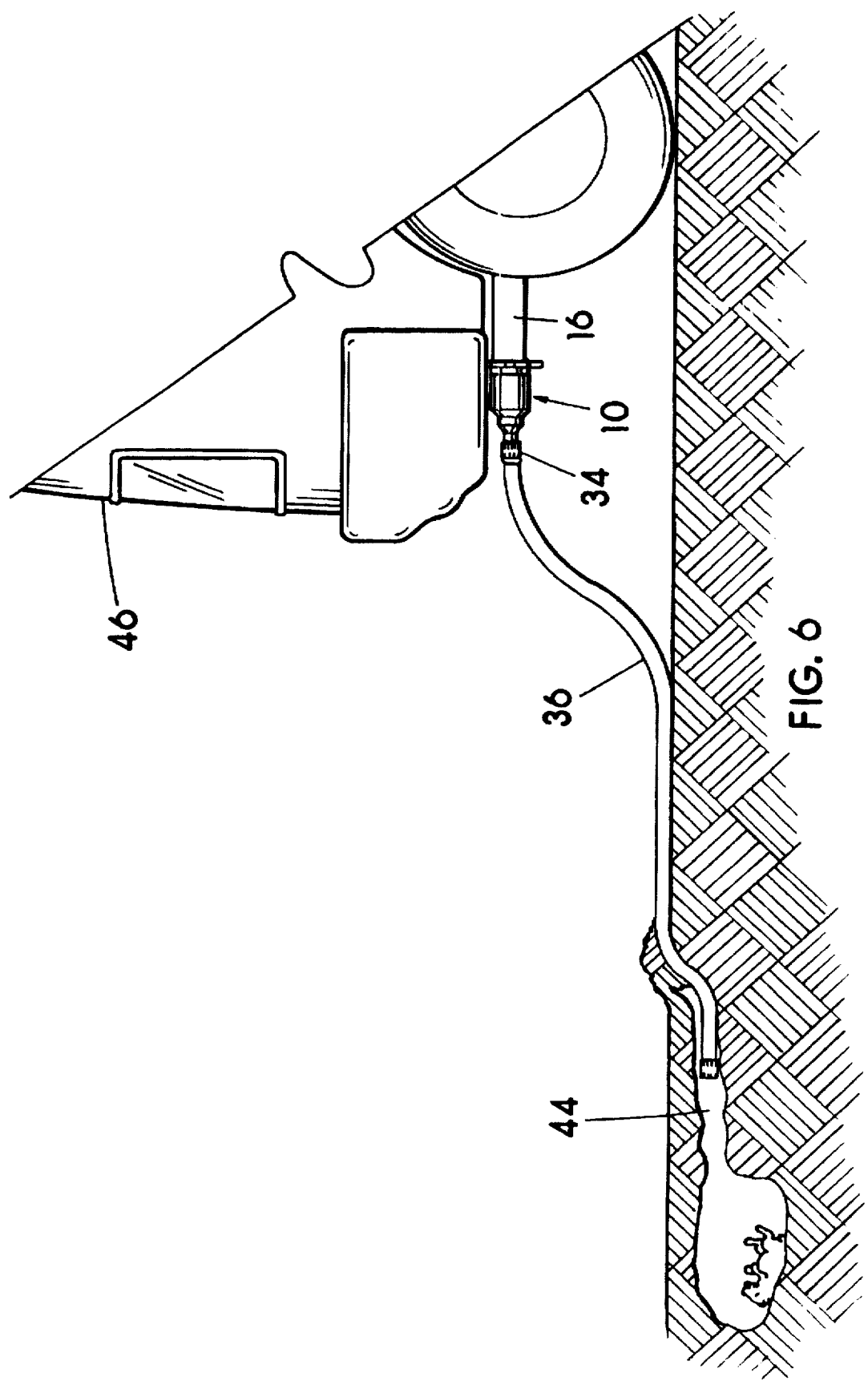
FIG. 6 is an in use-illustration showing the exhaust pipe adapter in use introducing exhaust gasses into a vermin tunnel.

FIG. 1 shows an example of exhaust pipe adapter 10 in accordance with the present invention. Adapter 10 includes a flexible body 12, the body 12 also being preferably resilient and formed to be normally open, and is thus preferably a rubbery body. Adapter 10, as well as body 12 is essentially a tube open through its center and two oppositely disposed ends 14; 35. The tubular adapter 10 includes the cylindrical rubbery body 12 having a large open end 14 sized for fitting over the exhaust pipes 16 of most cars, pickup trucks, recreational vehicles and tractors as well as some lawnmowers. The reference number 46 designates a source vehicle which an internal combustion engine in FIG. 6, the engine not being shown in source vehicle 46, but is shown in the Dunn incorporated patent. As best shown in FIGS. 2 and 3, rubbery body 12 preferably includes at least two distinct open internal diameters, with a first being a large interior open diameter 13 adjacent the large open end 14 of the body 12, and the second being a smaller interior open diameter 15 positioned between the large diameter 13 and a small rigid male threaded tube 30 (conventional male hose fitting) having exposed threads 32 located at a terminal end of the body 12 oppositely disposed of the large diameter end opening 14. Threaded tube 30 allowing attachment of a female end 34 of a conventional garden hose 36.

Figure 4:
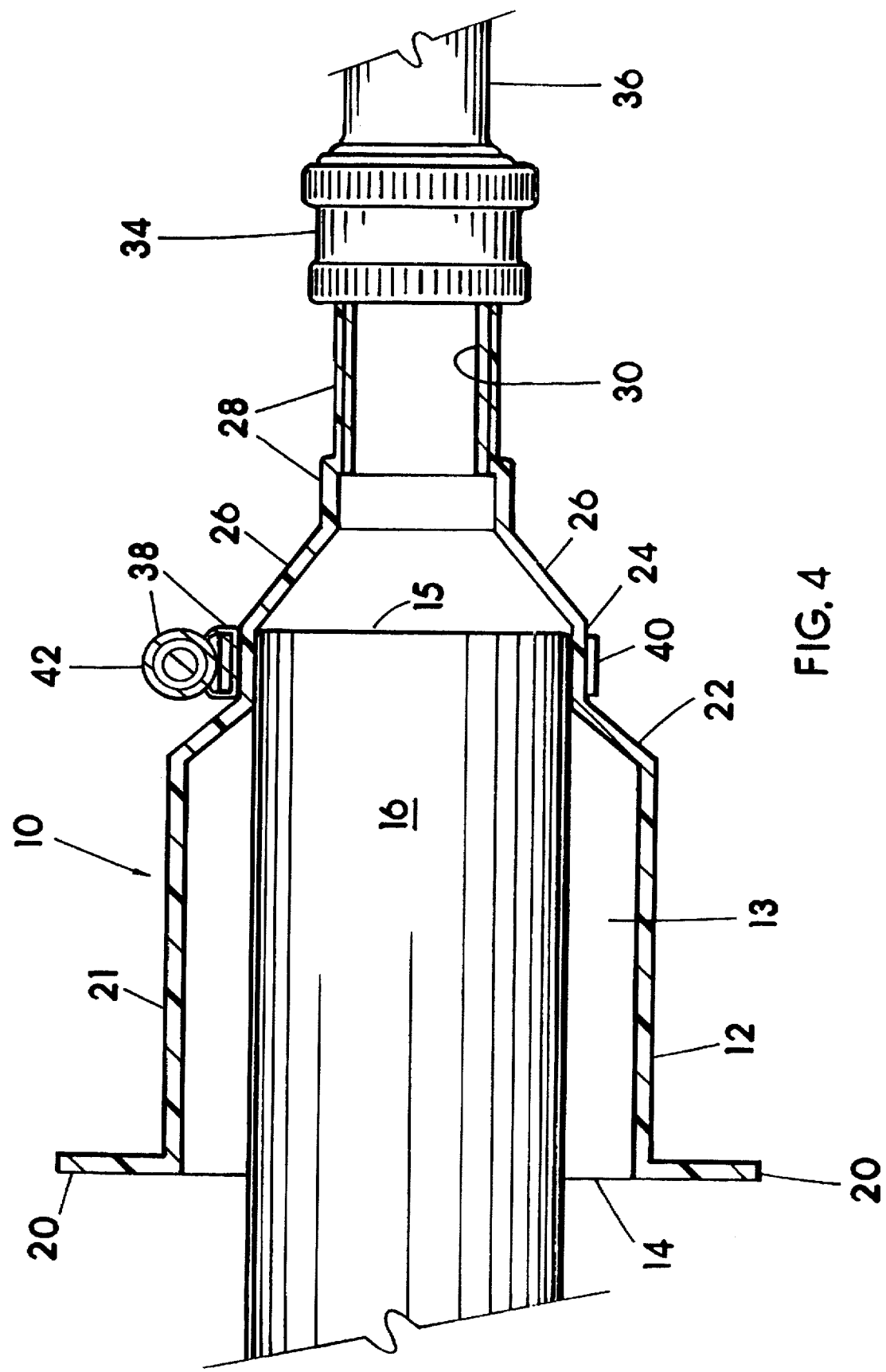
FIG. 4 is a cross-sectional side view showing the exhaust pipe adapter affixed with the hose clamp over a smaller sized exhaust pipe and the hose clamp moved over the smaller diameter area of the adapter.

The length of the rubbery body 12 is sized sufficiently long to adapt to exhaust pipes 16 having the lower edge cut at an angle or beveled as shown in FIGS. 3 and 4, thereby the adapter body 12 provides enough length to position the hose clamp 38 (adjustable band) past or beyond the beveled edge of the exhaust pipe and about the exterior of the adapter 10 (body 12). The widely adjustable hose clamp band 38 is used to compress the rubbery body 12 inward onto the exterior surface of the exhaust pipe 16. Hose clamp 38 includes an overlapping flat annular metal band 40 having transverse slots affixed with a barrel and screw designated coupler 42 which constricts or widens the diameter of band 40 based on the threads of the screw engaging the slots, and the direction of rotation of the screw. The screw of coupler 42 can be manipulated with a conventional screwdriver, hex-socket or may be affixed with a wingnut which can be manually operated by hand without a wrenching tool. Although hose clamp 38 is preferred since it is highly effective, readily available and easy to use, a draw string band or a hook and loop fastener strapping band arrangement could be used within the scope of the invention.

The large diameter open end 14 of the body 12 includes a plurality of laterally extending attached short tabs 20 spaced equidistant from one another around the terminal edge 18 of body 12. Tabs 20 are used as graspable members to stretch the large opening 14 of the adapter over the larger sized exhaust pipes, and the tabs 20 also prevent the hose clamp 38 from slipping off the large open end 14 of the body 12. The large interior diameter area 13 of the body 12 tapers or angles downward into the smaller internal diameter 15; the smaller internal diameter 15 being for adapting to smaller exhaust pipes 16, which are found on most passenger vehicles. The tapering or angular transition between the large internal diameter 13 and the smaller internal diameter 15 eliminates an abrupt edge, and thus helps guide smaller exhaust pipes centrally into the smaller diameter area 15 while sliding adapter 10 over the exhaust pipe terminal end. As shown in FIG. 2, an annular wall 21 defines the first section of body 12 in essence defining the larger interior diameter 13. One end of wall 21 includes the terminal edge 18 in essence defining opening 14. Terminal edge 18 is considered to be at the back end of the adapter 10, and the male threaded tube 30 is considered to be at the front end of the adapter 10. At the forward end of wall 21 is an attached sloped annular wall 22 which tapers downward to an annular wall 24 which is smaller in diameter than wall 21, and defines smaller interior diameter 15. Hose clamp 38 can be placed about annular wall 24 as shown in FIG. 4. Annular wall 26 is connected to the forward end of wall 24 and slopes forward and downward to an annular neck portion or wall 28 of body 12 in which a short unthreaded tubular body portion of threaded connector tube 30 is retained. Walls 21, 22, 24, 26, 28, and tabs 20 are preferably all integrally formed of molded rubbery material such as SBR (styrene-butadiene), and so from one vantage point the walling defining body 12 is a single annular wall having varying diameters. Other elastomers, such as, high temperature silicone rubbers, for example, could also be used, as well as some high temperature woven fabrics and fabric based laminates to define body 12. The preferred SBR rubber material defining the neck 28 tightly surrounds the exterior of the threaded tube 30 to hold the fitting in place attached to body 12. Body 12 could be manufactured separately from tube 30, and then tube 30 could be inserted into a small open front end of the body 12 and secured in place such as with adhesives, or a plastic or metal band. In manufacturing adapter 10 with a rubbery body in a preferred manufacturing process, the tubular fitting 30, which is preferably made of metal such as brass, but could be made of rigid plastics, is inserted into a properly shaped injection molding cavity prior to the SBR being shot into the cavity around the exterior sidewall of tube 30 to define body 12 and tabs 20. If the SBR covers the threads 32 of tube 30 during molding, a knife can be used to remove the rubber in the area of the threads 32. The external diameters and shapes of the exterior of the body 12 is basically the same, plus the wall thicknesses, as the internal diameters and shapes as can be ascertained from the drawings.

The following dimensions are given so that the reader can readily appreciate the approximate dimensions of adapter 10, and these dimensions are for example only, as they can be changed within the scope of the invention. The overall length of adapter 10 is about 6½ inches. The larger exterior diameter of body 12 adjacent opening 14 is about 3 inches, and the smaller exterior diameter in the region of area 15 is about 2⅜ inches. Interior open diameters 13 and 15 are about equal to the adjacent respective exterior diameters, as the wall thickness when using SBR for walls 21, 22, 24, 26 and 28 is about 3/32 inches.

For the purposes of this disclosure, the term "conventional" in reference to a garden water hose defines a flexible tube of substantial length, such as 25 feet or longer, although such hoses are made shorter, and which has two oppositely disposed ends, with each end having a threaded fitting of an opposite sex relative to the fitting on the opposite end of the hose. Conventional garden water hoses are most commonly sold in the U.S.A in ½, ⅝ and ¾ inch nominal diameters, with these sizes having terminal end threaded fittings referred to and "¾ inch" size, with this ¾ inch size reference referring to the nominal interior open diameter of the fitting. One-inch size hoses and fittings are available but are relatively rare, and thus will not be further addressed. One end of the conventional garden water hose has a male threaded fitting, and the opposite end of the hose has a female coupling fitting typically being a rotatable open ended collar having threads on the interior sidewall of the collar to mate with the male threaded exposed terminal end of a hose bib or water faucet. The male thread arrangement on a hose bib is the same as the male thread arrangement on one end of the garden water hose, and thus the female end fitting of the garden water hose can be threadably engaged with either a standard hose bib having a ¾ inch output, or the male end of a another garden water hose. Garden water hoses are widely available in the U.S.A., and the male and female end fittings are substantially standardized in diameter, threads per inch, which is about 11.5 threads per inch, thread size and taper, so that conventional garden hoses can be mated to conventional hose bibs or other conventional garden water hoses without regard to which company manufactured the hose or hose bib. "Conventional" in this disclosure in reference the male and female garden water hose ends refers to that standardized interior diameter of the female collar or exterior diameter of the male tube, and the thread size, shape, taper and threads per inch that is used as the standard in the U.S.A. for "¾ inch" hose bibs and garden water hose ends. Male fitting 30 attached to body 12 is standard or conventional to conventional garden water hoses sold for use in the U.S.A. It should be realized that a garden water hose can be used for purposes other than watering a garden, such as for cleaning cars and sidewalks for example, and thus "garden water hose" is being used in reference to the hose structure, and not for any particular use for which this structure of hose may be sold.

Figure 5:
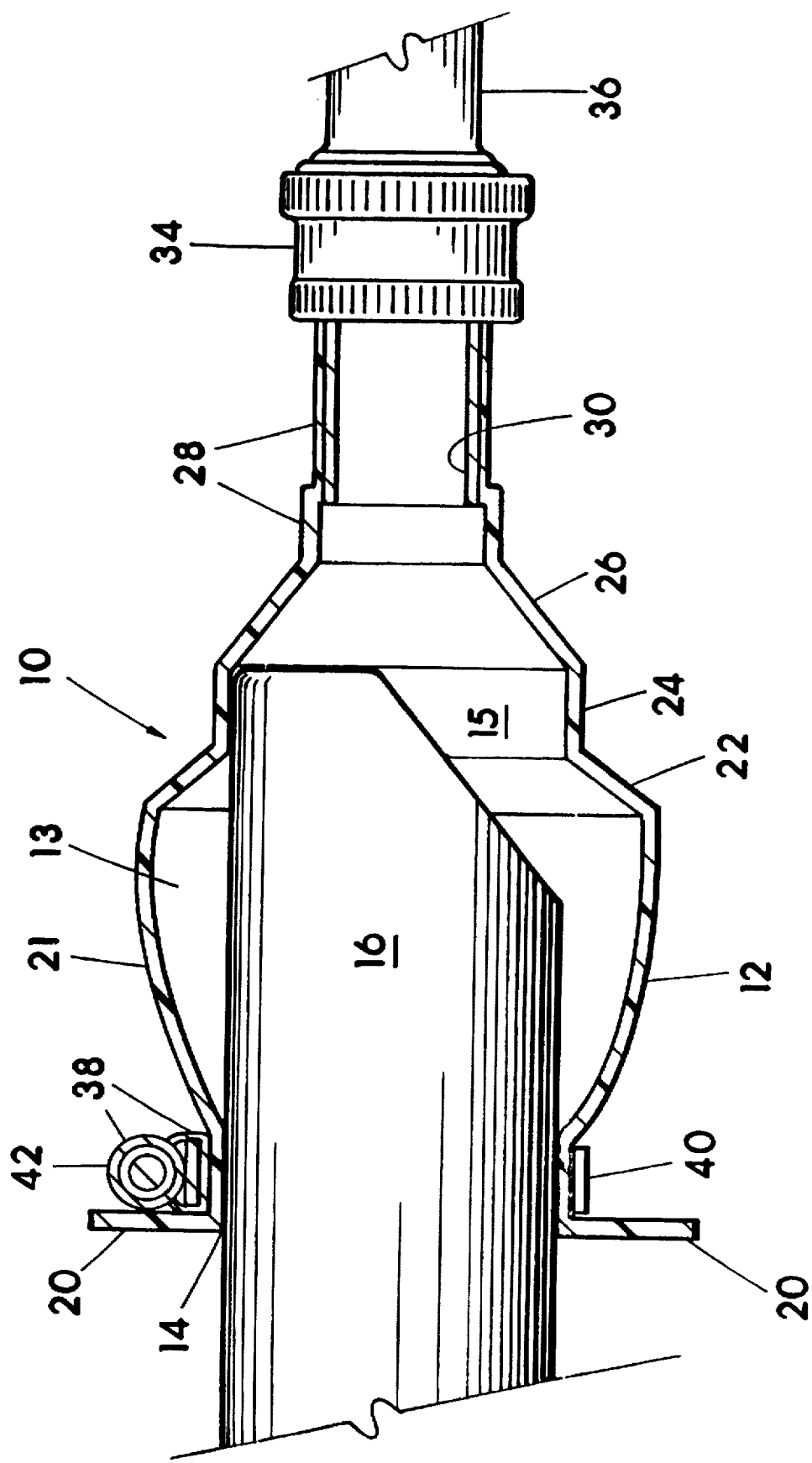
FIG. 5 is a cross-sectional side view showing the exhaust pipe adapter affixed over a smaller sized exhaust pipe which contains an angled-cut lower edge. The hose clamp is shown moved or relocated to the large open end area of the adapter and constricted to engage the exhaust pipe securely.

To utilize exhaust pipe adapter 10, open end 14 of body 12 is fitted over the distal end of exhaust pipe 16. When using adapter 10 on larger diameter exhaust pipes 16 which only fit into large interior diameter area 13, hose clamp 38 is positioned about the exterior of wall 21 near edge 18 adjacent the extending tabs 20, and then is tightened as shown in FIGS. 2 and 3. For smaller sized exhaust pipes 16 which are square cut on the end and which fit into smaller interior diameter area 15, the hose clamp 38 is preferably positioned about the exterior of the wall 24, and then tightened as shown in FIG. 4, although the clamp 38 could be located on wall 21 as shown in FIG. 5. For smaller sized exhaust pipes 16 which have a bevel or angular cut end and which fit into smaller interior diameter area 15, the hose clamp 38 is positioned about the exterior of wall 21, and then tightened as shown in FIG. 5 in order to compress body 12 to the exhaust pipe 16 beyond the angular cut. Preferably for simplicity and cost factors, the same single hose clamp 38 is used for both large and small diameter exhaust pipes, and thus, clamp 38 is widely adjustable in its diameter. Then, threaded connector 30 is connected to the female end 34 of a garden hose 36. The opposite or free end of hose 36 is placed into an open rodent or vermin tunnel in the ground 44 with dirt placed around the opening to prevent the exhaust gasses from escaping. The engine, for example, of vehicle 46 is then started whereby exhaust or carbon monoxide gas, is directed from the exhaust pipe 16 into and through adapter 10, and then into and through garden hose 36 and into the vermin tunnel system. The engine is operated for approximately 15 to 30 minutes to ensure the filling of the tunnel system with the poisonous gasses. Adapter 10 and hose 38 are then removed from exhaust pipe 16 and the opening of the vermin tunnel is covered with soil to contain the gas within the tunnel.

Although I have very specifically described the preferred structures and use of the invention, it should be understood that some changes in the specific structures described and shown in my drawings may clearly be made without departing from the true scope of the invention.

What I claim as my invention is:

1. An exhaust pipe adapter for connecting a conventional garden water hose to an internal combustion engine exhaust pipe of a vehicle for purposes of exterminating underground dwelling vermin by exhaust fumes directed through the garden water hose into an underground dwelling of the vermin; said adapter comprising;

a tubular body, said tubular body open therethrough and having a first end opening and a second end opening oppositely disposed from said first end opening, said first end opening defined by an open rigid tube having exposed male threads properly sized and positioned for cooperative threaded engagement with a conventional threaded female fitting on an end of a conventional garden water hose;

said second end opening defined by an annular flexible wall of said tubular body; said second end opening sized for receiving an exhaust pipe terminal end so as to allow placement of the pipe terminal end in said tubular body; said wall being sufficiently flexible to allow said wall to be squeezed inward by adjustable band means encircling an exterior surface of said wall for tightening and securing said tubular body to an exhaust pipe terminal end;

said tubular body including multiple interior diameters defined by diametric changes in said wall with a larger interior diameter adjacent said second end opening, and a smaller interior diameter positioned between said larger interior diameter and said rigid tube.

2. An exhaust pipe adapter according to claim 1 wherein said wall is made of flexible and resilient material.

3. An exhaust pipe adapter according to claim 2 wherein said adjustable band means is a metal hose clamp.

4. An exhaust pipe adapter according to claim 3 wherein said rigid tube with exposed male threads is made of metal attached to said wall.

5. An exhaust pipe adapter according to claim 4 wherein said wall is made of flexible and resilient material having a temperature service factor of at least 200 degrees fahrenheit.

6. An exhaust pipe adapter according to claim 5 wherein said flexible and resilient material is SBR.

7. An exhaust pipe adapter according to claim 6 wherein a transition between said larger interior diameter and said smaller interior diameter is a tapering transition to serve to help guide small exhaust pipe terminal ends into said smaller interior diameter.

8. An exhaust pipe adapter according to claim 7 wherein said wall defines said larger interior diameter of sufficient length to provide for adequate inward placement of an exhaust pipe having an angular cut terminal end to allow clamping with said metal hose clamp beyond the angular cut in the exhaust pipe.

9. An exhaust pipe adapter according to claim 8 wherein multiple extending tabs extend laterally from said wall adjacent said second end opening for serving as graspable members and also to aid in maintaining said metal hose clamp in position.

10. An exhaust pipe adapter for connecting a conventional garden water hose to an internal combustion engine exhaust pipe of a vehicle for purposes of exterminating underground dwelling vermin by exhaust fumes directed through the garden water hose into an underground dwelling of the vermin; said adapter comprising;

a tubular body, said tubular body open therethrough and having a first end opening and a second end opening oppositely disposed from said first end opening, said first end opening defined by an open tubular structure having threads properly sized and positioned for cooperative threaded engagement with a conventional threaded fitting on an end of a conventional garden water hose;

said second end opening defined by an annular flexible wall of said tubular body; said second end opening sized for receiving an exhaust pipe terminal end so as to allow placement of the pipe terminal end in said tubular body; said wall being sufficiently flexible to allow said wall to be squeezed inward by adjustable band means encircling an exterior surface of said wall for tightening and securing said tubular body to an exhaust pipe terminal end;

said tubular body including multiple interior diameters defined by diametric changes in said wall with a larger interior diameter adjacent said second end opening, and a smaller interior diameter positioned between said larger interior diameter and said open tubular structure having threads.

11. An exhaust pipe adapter according to claim 10 wherein said wall is made of flexible and resilient material.

12. An exhaust pipe adapter according to claim 11 wherein said adjustable band means is a metal hose clamp.

13. An exhaust pipe adapter according to claim 12 wherein said open tubular structure having threads includes said threads being male type, and is made of metal attached to said wall.

14. An exhaust pipe adapter according to claim 13 wherein said wall is made of flexible and resilient material having a temperature service factor of at least 200 degrees fahrenheit.

15. An exhaust pipe adapter according to claim 14 wherein said flexible and resilient material is SBR.

16. An exhaust pipe adapter according to claim 15 wherein a transition between said larger interior diameter and said smaller interior diameter is a tapering transition to serve to help guide small exhaust pipe terminal ends into said smaller interior diameter.

17. An exhaust pipe adapter according to claim 16 wherein said wall defines said larger interior diameter of sufficient length to provide for adequate inward placement of an exhaust pipe having an angular cut terminal end to allow clamping with said metal hose clamp beyond the angular cut in the exhaust pipe.

18. An exhaust pipe adapter according to claim 17 wherein multiple extending tabs extend laterally from said wall adjacent said second end opening for serving as graspable members and also to aid in maintaining said metal hose clamp in position.

* * * * *